(12) United States Patent
Nikovski

(10) Patent No.: US 8,762,036 B2
(45) Date of Patent: Jun. 24, 2014

(54) METHOD FOR PREDICTING TRAVEL TIMES USING AUTOREGRESSIVE MODELS

(71) Applicant: Mitsubishi Electric Research Laboratories, Inc., Cambridge, MA (US)

(72) Inventor: Daniel Nikolaev Nikovski, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 13/677,645

(22) Filed: Nov. 15, 2012

(65) Prior Publication Data

US 2014/0136088 A1    May 15, 2014

(51) Int. Cl.
*G06F 19/00* (2011.01)
*G08G 1/01* (2006.01)
*G01C 21/34* (2006.01)
*G01C 21/26* (2006.01)

(52) U.S. Cl.
CPC .............. *G08G 1/01* (2013.01); *G08G 1/0145* (2013.01); *G01C 21/3492* (2013.01); *G01C 21/26* (2013.01)
USPC ............. 701/117; 701/118; 701/66; 701/436; 701/484

(58) Field of Classification Search
CPC ....... G08G 1/01; G08G 1/0145; G01C 21/34; G01C 21/3492; G01C 21/36; G01C 21/26; G01C 21/28
USPC .................... 701/117, 118, 66, 423, 436, 484
See application file for complete search history.

(56) References Cited

U.S. PATENT DOCUMENTS

| | | | | |
|---|---|---|---|---|
| 5,696,503 | A * | 12/1997 | Nasburg | 340/933 |
| 5,970,414 | A * | 10/1999 | Bi et al. | 455/456.3 |
| 6,118,765 | A * | 9/2000 | Phillips | 370/235 |
| 6,285,950 | B1 * | 9/2001 | Tanimoto | 701/465 |
| 7,890,258 | B2 * | 2/2011 | Endo et al. | 701/423 |
| 8,068,973 | B2 * | 11/2011 | Yamane et al. | 701/117 |

OTHER PUBLICATIONS

T. Nakata, J. Takeuchi, "Mining Traffic Data from Probe—Car System for Travel Time Prediction", KDD '04 Proceedings of the tenth ACM SIGKDD international conference on Knowledge discovery and data mining, pp. 817-822 ACM New York, NY, USA 2004.

* cited by examiner

*Primary Examiner* — Gertrude Arthur Jeanglaud
(74) *Attorney, Agent, or Firm* — Dirk Brinkman; Gene Vinokur

(57) ABSTRACT

Future travel times along links are predicted using training and prediction phases. During training, seasonal intervals, a seasonal component of the training inflows are learned. The seasonal component is subtracted from the training inflows to obtain training deviations from the training inflows to yield statistics, which along with the seasonal components form a model of traffic flow on the link. During prediction, current travel times on the link are collected for current seasonal intervals to determine current inflows. A most recent travel time is subtracted from a most recent inflow to obtain a current deviation. For a future time, a predicted deviation is estimated using the statistics. The seasonal component is added to the predicted deviation to obtain a predicted inflow from which the future travel time is predicted.

10 Claims, 2 Drawing Sheets

100

200

US 8,762,036 B2

METHOD FOR PREDICTING TRAVEL TIMES USING AUTOREGRESSIVE MODELS

FIELD OF THE INVENTION

The invention relates to predicting travel times, and more particularly to predicting travel times for vehicles based on collected historical data of seasonal variations of travel times.

BACK GROUND OF THE INVENTION

Many transportation problems, such as car navigation, vehicle fleet management, scheduling of deliveries and other logistical transportation operations, depend on an availability of accurate travel time estimates for all links, e.g., roads, in a transportation network. If free-flowing traffic conditions are assumed, then travel times for any link can easily be estimated as a ratio of a length of a link and a velocity of a vehicle.

However, in many areas, free-flowing traffic conditions are often not observed, due to congestion, especially during peak or rush hours. As a result, routing guidance systems that use travel time estimates under free-flowing conditions would consistently direct vehicles into traffic jams, further exacerbating traffic conditions.

More recent vehicle routing systems, such as the Japanese Vehicle information and Communication System (VICS), and the European Radio Data System (RDS) Traffic Message Channel (TMC) use a most recent travel time on a link as an estimate for future travel times on that link.

However, in a dynamic transportation network, travel times change quickly, especially at the onset of peak hours. Therefore, estimates quickly become outdated and irrelevant, especially for links that would be traversed last by the vehicle to a destination, in some cases hours after the route is planned, and its traversal initiated. Using such estimates, although more accurate than those under free-flowing conditions, results in a route selection that is still very far from optimal, especially for longer routes that occur during peak hours.

Examples of such routes include morning and late afternoon trips made by commuters, who are some of the most important users of route guidance systems, and rely critically on finding a best route to and from work while avoiding traffic jams as much as possible.

For this kind of route guidance, a routing system would benefit from methods that can predict travel times at all times in the near future, up to several hours. This problem is known as short-term travel time prediction.

Two basic methods are known. The first method is from a physical simulation perspective, where an entire transportation network, or its individual links, are simulated using a physically realistic simulator, and travel times are obtained as byproducts of the simulation. While that method can be very accurate, it is rarely feasible, because the simulation model must be calibrated accurately, and the input conditions, such as traffic flows into and out of the network, must also be supplied. In practice, calibration is a difficult and laborious process, and future traffic flows and operating conditions are generally not known.

The second method is an entirely data-driven, machine learning approach, where historical travel time data are maintained, and a predictive model is fitted to the data modeling the dependency of future travel times on current and past travel times.

Various regression techniques, such as linear regression, neural networks, state-space models, etc., have also been used, with much success in predicting future travel times up to several hours into the future with reasonable accuracy.

The data-driven approach can be very practical, because it uses data that are already being collected by current travel time measurement systems, such as VICS and RDS-TMC. However, prior art purely data-driven prediction methods can easily violate important physical properties of travel times, and most notably the First-In-First-Out (FIFO) property. This property is the result of the queueing nature of road links. A vehicle that enters the link later than another vehicle is likely to exit the link after the other vehicle. This property is strictly true if the link only admits one vehicle at it time, and passing is not allowed. This can also be true for multi-lane roadways, wherein, during peak hours, it is difficult for later vehicles to advance through jammed traffic. Thus, for general links, this is true in terms of the expectation of travel times.

If $\tau(t_1)$ is the expected travel time of a vehicle entering the link at time $t_1$, and $\tau(t_2)$ is the expected travel time of a vehicle entering the link at time $t_2$, such that $t_2 > t_1$, then the FIFO property can be expressed as $t_2 + \tau(t_2) \geq t_1 + \tau(t_1)$, even though $\tau(t_1)$ can have any relationship to $\tau(t_2)$, e.g., less than, equal to, or greater. Because $\tau(t_1)$ and $\tau(t_2)$ are usually predicted completely independently of each other by data-driven prediction methods, there is typically nothing to enforce the FIFO property between the predictions.

In addition to producing physically unrealistic and possibly inaccurate predictions, violating the FIFO property has one other very negative consequence; it makes the optimal routing problem intractable. If the FIFO property holds in a dynamic transportation network, then finding the optimal route is possible in polynomial time. If it does not hold, a polynomial solution does not exist. For this reason, finding a travel-time prediction method such that the predicted travel times satisfy the FIFO property is an important practical problem.

SUMMARY OF THE INVENTION

Future travel times along, links are predicted using training and prediction phases.

During training, seasonal profiles, a seasonal component of the training inflows are learned. The seasonal component is subtracted from the training inflows to obtain training deviations from the training inflows to yield statistics, which along with the seasonal components form a model of traffic flow on the link.

During prediction, current travel times on the link are collected for current seasonal intervals to determine current inflows. A most recent travel time is subtracted from a most recent inflow to obtain a current deviation. For a future time, a predicted deviation is estimated using the statistics. The seasonal component is added to the predicted deviation to obtain a predicted inflow from which the future travel time is predicted.

DETAILED DESCRIPTION OF THE PREFERRED EMBODIMENTS

Figure 1:
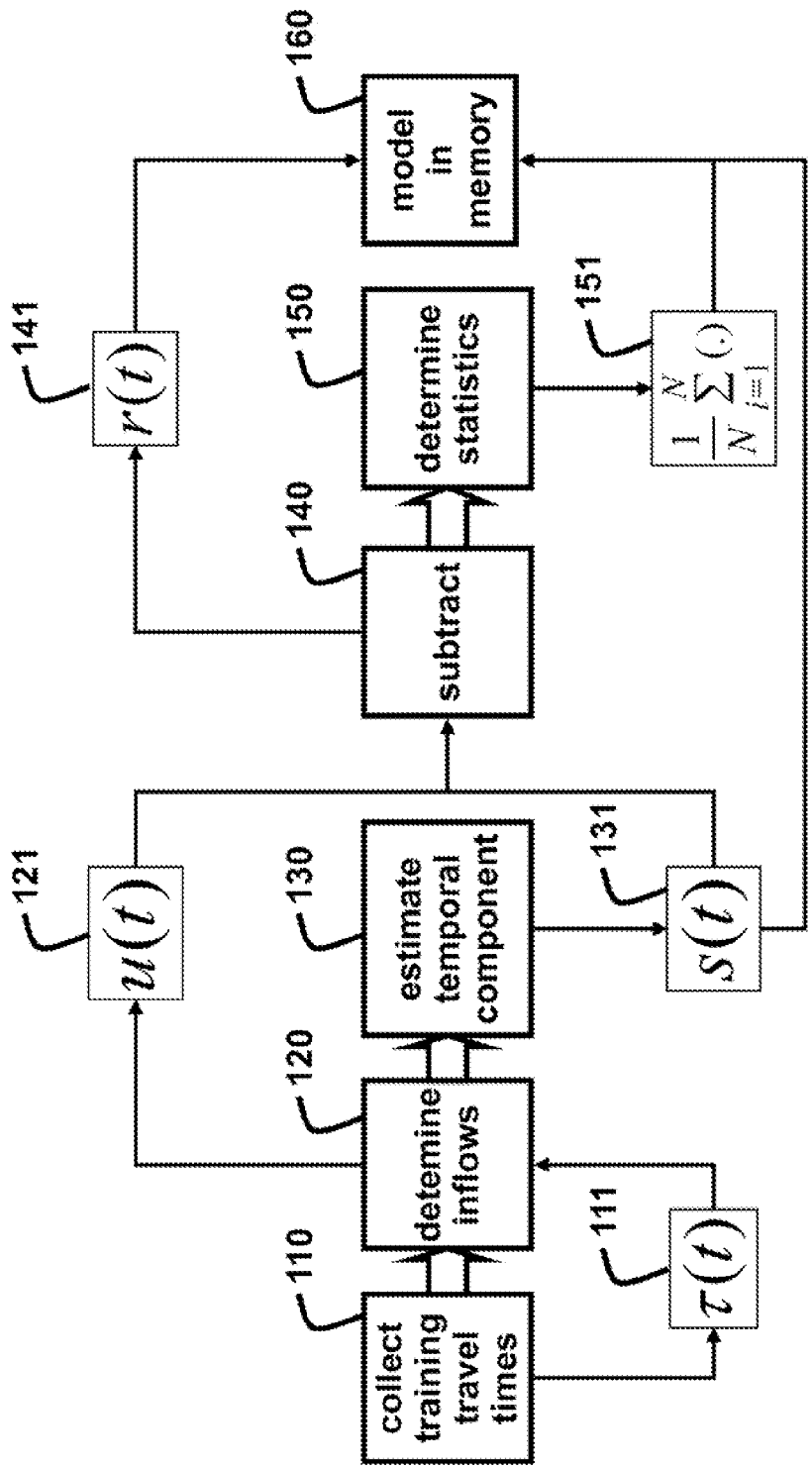
FIG. 1 is a flow diagram of a training phase of a method for predicting travel times based on seasonal models.

Seasonal Auto Regressive Whole-Link Model for Travel Times

The embodiment of the invention provides a method for predicting future travel times of a vehicle on a link. The prediction uses a seasonal auto-regressive stochastic process, constrained by a fixed non-linear relationship between travel times and (weighted) traffic inflows on the link.

The statistics of a seasonal model are estimated from historical training data. During real-time, link inflows and outflows are inferred from current data measurements. Link inflows and outflows are inferred from actual data measurements, and the travel times are predicted from the current data according to the model.

The only training data that are collected are travel times $\tau(t_i)$ during a sequence of time intervals $\{t_0, t_1, \ldots, t_N\}$, such that $t_{i+1} \geq t_i$. The data can be collected during regular time intervals I of duration $\Delta t$, such that $t_i = i\Delta t$. The sampling interval can be constant, e.g., $\delta_i = \Delta t$.

However, the intervals do not have to be equally spaced in time, and the data can be collected, for example, by "probe" cars that report the actual time for a specific vehicle to traverse the road link, or by a traffic measurement system that aggregates data from many sensors, e.g., induction loops on the road surface. The sensors collect periodic estimates of travel times.

A dependency $\tau(t) = f(t)$ between travel times $\tau(t)$ at time t and an aggregate weighted estimate w(t) of the inflow on the link is assumed with $$w(t) = \beta u(t) + (1-\beta) v(t+\tau(t)), \quad (1)$$

where u(t) is the inflow rate of the link at time t, $v(t+\tau(t))$ is the outflow rate of the link at time $t+\tau(t)$, and $\beta$ is a constant weight.

When the FIFO property holds, the outflow rate $v(t+\tau(t))$ is $$v(t+\tau(t)) = \frac{u(t)}{1+\tau'(t)}, \quad (2)$$

where $\tau'$ indicates a first derivative of travel time $\tau$.

The dependency $\tau(t) = f(w(t))$ can take an number of forms. A linear dependency can be expressed as $f = aw(t)+1$ for suitable linear coefficients a and b. A more realistic form is a U.S. Bureau of Public Roads (BPR) performance link function $$f(w(t)) = \tau_f \left(1 + \alpha \left(\frac{w(t)}{c}\right)^\gamma \right), \quad (3)$$

where $\tau_f$ is the travel time under free-flowing conditions with no congestion and vehicles moving at a velocity equal to the speed limit, c is the link capacity, and $\alpha$ and $\gamma$ are suitably selected weight parameters, e.g., $\alpha = 0.15$ and $\gamma = 4$.

In all cases, the function $f(\cdot)$ is monotonically increasing, i.e., the higher the traffic flow, the longer the travel time. Under this assumption, its inverse function $f^{-1}(\cdot)$ always exists.

Furthermore, the inflows u(t) are assumed to originate from a specific stochastic process known as a seasonal autoregressive process of order one, also known as a seasonal autoregressive (SAR(1)) process. Under this assumption, the inflow u(t) at any time can be decomposed into a seasonal component s(t), and a random component r(t), such that the random component is an autoregressive process of order one (AR(1)):

$$u(t) = s(t) + r(t).$$

Because of the explicit inclusion of a seasonal component s(t), without loss of generality, the AR(1) process is zero-mean. When the zero-mean. AR(1) process is sampled at regular intervals of duration $\Delta t$, such that $t_i = i\Delta t$, the zero mean is $$r(t_i) = \rho r(t_{i-1}) + \epsilon(t_i), \quad (4)$$

where $\epsilon(t)$ is a Gaussian white-noise process with zero mean and variance $\sigma^2(t_i)$, and $\rho$ is an autoregressive coefficient that relates the current value of $r_i = r(t_i)$ to the previous value $r_{i-1}$.

When the AR(1) process is not sampled at regular intervals, but at arbitrary times to $t_0, t_1, \ldots, t_N$, as in the traffic prediction case, the random component r(t) comes from the Ornstein-Uhlenbeck stochastic process. Below, the random component is called the "deviation." it can also be called the "residual" after subtracting the seasonal component from the original time series. The derivation and meaning of the deviation are described with reference to step T4-140 below.

The Eugene Uhlenbeck process theoretically describes the velocity of a massive Brownian particle under the influence of friction. The process is stationary, Gaussian, and Markovian, which is the continuous-time analog of the AR(1) process:

$$r(t_i) = e^{\lambda \delta_i} r(t_{i-1}) + \epsilon(t), \quad (5)$$

where $\delta_i = t_i - t_{i-1}$, $i = 1, \ldots, N$, and $\lambda$ is a mean-reversion rate of the Ornstein-Uhlenbeck stochastic process. Clearly, $\lambda$ and $\beta$ are related as $\rho = e^{\lambda \Delta t}$.

Procedure for Short-Time Prediction of Travel Times

Figure 2:
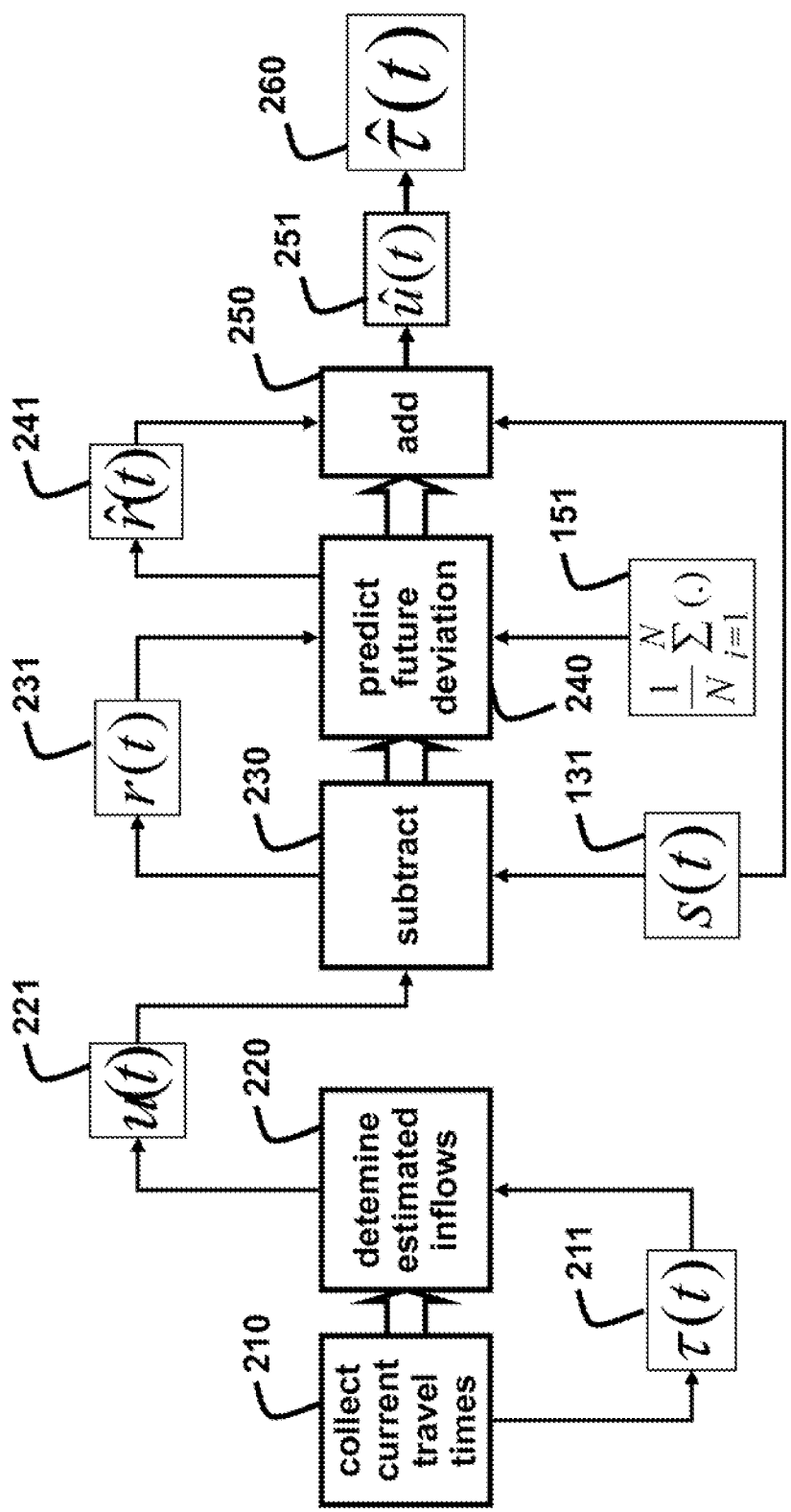
FIG. 2 is a flow diagram of a prediction phase of a method for predicting travel times based on seasonal models.

FIG. 1 shows a training phase of a method for predicting travel times and constructing a seasonal model 160, and FIG. 2 shows the prediction, phase using, the model.

Based on the model, the following method can be used for short-time prediction of travel-times, based on the collected data. The method has a training phase 100 to collect training data and estimate the model, and a prediction phase 200, where the model is used for travel time predictions.

Training (T)

The training phase has the following general steps:

T1-110: Collect a time series of data of training travel times $\{\tau(t_0), \tau(t_1), \ldots, \tau(t_N)\}$ 111 during time intervals $\{t_0, t_1, \ldots, t_N\}$, such that $t_{i+1} \geq t_i$;

T2-120: Determine 120 a sequence of expected estimated inflows $\{u(t_i)\}$ 121 from the training travel times $\{\tau(t_i)\}$;

T3-130: Estimate 130 a seasonal component s(t) 131 during any time interfval t from the estimated inflows, and store the seasonal component in a memory;

T4-140: Subtract 140 the seasonal component $s(t_i)$ from the estimated inflows $\{u(t_i)\}$ to obtain deviations $\{r(t_i)\}$ 141 from the estimated inflows: $r(t_i) = u(t_i) - s(t_i)$; and T5-150: Determine predictive statistics 151 from the deviations $\{r(t_i)\}$ and store the statistics in the memory. The statistics can be an autoregressive coefficient $\rho$, or a mean-reversion rate $\lambda$. The statistics essentially characterize the model 160, Prediction (P)

The prediction phase is performed in real-time, and includes the following steps:

P1-210: Collect current travel times $\{\tau(t_0), \tau(t_1), \ldots, \tau(t_N)\}$ 211 during a sequence of current time intervals $\{t_0, t_1, \ldots, t_N\}$ of a current day, such that $t_{i+1} \geq t_i$, and $t_N$ is the most recent current time;

P2-220: Determine 220 a sequence of estimated inflows $\{u(t_i)\}$ 221 from the current travel, times $\{\sigma(t_i)\}$;

P3-230: For the most recent travel time $t_N$, subtract the seasonal component $s(t_N)$ from the estimated inflow $u(t_N)$ at that time, to obtain the current deviation $r(t_N)$ 231 from the expected inflows: $r(t_N) = u(t_N) - s(t_N)$;

P4-240: For a future time $t > t_N$, estimate the predicted deviation r(t) 241 from the seasonal inflow at that future time as $\hat{r}(t)=\rho^k r(t_N)$, if the prediction interval of time $t-t_N$ is an exact multiple $k=(t-t_N)/\Delta t$ of the constant time period $\Delta t$, otherwise, $\hat{r}(t)=e^{\lambda(t-t_n)}r(t_N)$;

P5-250: Add the seasonal component $s(t)$ to the predicted deviation $\hat{r}(t)$ to obtain the predicted inflow $\hat{u}(t)$ 251 at time $t$: $\hat{u}(t)=s(t)+\hat{r}(t)$; and P6-260: Determine the final travel time prediction $\hat{\tau}(t)$ from the predicted inflow $\hat{u}(t)$.

The steps of the training and prediction phases can be performed in a processor connected to memory and input/output interfaces as known in the art. Several of these steps are now described in greater detail.

Steps T2 and P2: Estimation of Inflows from Observed Travel Times

These steps are identical for the training and prediction phases. The purpose is to estimate the inflows $\{u(t_i)\}$ that resulted in the travel times $\{\tau(t_i)\}$. A backward finite difference approximation for the first derivative $\tau'(t)$ of travel time in Equation 2 is $$\tau'(t_i) \approx \frac{\tau(t_i) - \tau(t_{i-1})}{t_i - t_{i-1}},$$

which can combine Equations 1 and 2 into $$w(t_i) = u(t_i)\left[\beta + \frac{(1-\beta)(t_i - t_{i-1})}{t_i - t_{i-1} + \tau(t_i) - \tau(t_{i-1})}\right].$$

By inverting the postulated dependency $\tau(t)=f(w(t))$ the following equation can be solved for each time interval $t_i$ except $t_0$, to obtain the sequence $\{u(t_i)\}$, $i=1, 2, \ldots, N$:

$$f^{-1}(\tau(t_i)) = u(t_i)\left[\beta + \frac{(1-\beta)(t_i - t_{i-1})}{t_i - t_{i-1} + \tau(t_i) - \tau(t_{i-1})}\right]. \quad (6)$$

In practice, for step P2, only the most recent traffic inflow $u(t_N)$ has to be determined. The most recent inflow it can be determined, from the two most recent travel times $\tau(t_N)$ and $\tau(t_{N-1})$.

Step T3: Estimate the Seasonal Component of Traffic Inflows

There are many possible ways to estimate the seasonal component of time series data when the time interval of that component is known. For traffic flows, the main seasonal components can be hourly, daily, weekly, monthly, and early cycles. The daily cycle has morning and afternoon peaks.

To model the seasonal component, it is sufficient to determine the time of the day $T_i$ that corresponds to the time $t_i$ when the travel time $\tau(t_i)$ was collected, such that $T_i$ is in the range of [0, 24] hours. If the seasonal component $S(T)$ of link inflows for time of the day $T$ is needed, then the k nearest times $T_i$ stored in memory can be found, and the average of their corresponding estimated inflows $u(T_i)$ can be used as an estimate of the seasonal component $s(T)$.

Modeling of other seasonal cycles can be done in a similar manner. The weekly cycle can be modeled by using as estimates for the k nearest times $T_i$ on the same day of the week. One seasonal component can be used for workdays, and another component for weekend days. Public holidays during yearly cycles can also be integrated, as well as known special events that can impact traffic conditions.

Even longer seasonal cycles, such as the yearly cycle with its meteorological effect on traffic congestion, can also be modeled when travel time data spanning many years have been collected.

Step T5: Determine the Autoregressive Coefficient $\rho$ or the Mean-Reversion Rate $\lambda$ When data are collected during regular time intervals of duration $\Delta t$, such that $t_i = i\Delta t$, it is sufficient to estimate the statistics as an autoregressive coefficient $\rho$. From Equation 4, the average ratio of two consecutive deviations $r(t)$ can be estimated as $$\rho = \frac{1}{N}\sum_{i=1}^{N}\frac{r(t_i)}{r(t_{i-1})}.$$

When data are not collected during regular time intervals, but during arbitrary time intervals in time $t_i$, the statistics can be a mean reversion rate $\lambda$ estimated as $$\lambda = \frac{1}{N}\sum_{i=1}^{N}\frac{\ln r(t_i) - \ln r(t_{i-1})}{t_i - t_{i-1}}.$$

Step P6: Obtain the Expected Travel Time from the Predicted Link Inflow

This step can also use Equation 7, but in a reverse direction. Given a future time $t > t_N$, predicted inflow $\hat{u}(t)$, most recently measured travel time $\tau(t_N)$ at time $t_N$, and fixed parameter $\beta$ and function $f(\cdot)$, the expected travel time $\hat{\tau}(t)$ can be determined by solving the following equation with unknown parameters on both sides of the equation:

$$f^{-1}(\hat{\tau}(t)) = \hat{u}(t)\left[\beta + \frac{(1-\beta)(t - t_N)}{t - t_N + \hat{\tau}(t) - \tau(t_N)}\right]. \quad (7)$$

When the function $f(\cdot)$ is non-linear. Equation 7 is a non-linear equation, numerical root-finding methods can be used.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

I claim:

1. A method for predicting a future travel time on a link, comprising:
   a training phase comprising the steps of:
      collecting training travel times on the link for training seasonal intervals;
      determining training inflows from the training travel times;
      estimating a seasonal component of the training inflows;
      subtracting the seasonal component from the training inflows to obtain training deviations from the training inflows;
      determining statistics from the training deviations, wherein the seasonal components and the statistics form a model of traffic flow on the link; and
   a prediction phase comprising the steps of:
      collecting current travel times on the link for current seasonal intervals;

determine current inflows from the current travel times;

subtracting, for a most recent travel time from a most recent inflow to obtain a current deviation;

estimating, for a future time a predicted deviation using the statistics;

adding the seasonal component to the predicted deviation to obtain a predicted inflow; and determining the future travel time from the predicted inflow.

2. The method of claim 1, wherein the predicting uses a seasonal auto-regressive stochastic process constrained by a fixed non-linear relationship between the travel times and the inflows on the link.

3. The method of claim 1, wherein a dependency of a particular travel time $\tau(t)$ at a tune t and an aggregate estimate of a particular inflow u(t) is $$w(t)=\beta u(t)+(1-\beta)v(t+\tau(t)),$$

where $v(t+\tau(t))$ is a rate of outflow at time $t+\tau(t)$, and $\beta$ is a constant weight.

4. The method of claim 3, wherein the inflow rate is $$v(t+\tau(t)) = \frac{u(t)}{1+\tau'(t)},$$

where $\tau'$ indicates a first derivative of travel time $\tau$.

5. The method of claim 3, wherein the dependency is linear.

6. The method of claim 3, wherein the inflows u(t) originates from a seasonal autoregressive process of order one.

7. The method of claim 3, wherein the inflow u(t) is decomposed into the seasonal component s(t) and the deviation r(t), such that the deviation is an autoregressive process of order one.

8. The method of claim 7, wherein the autoregressive process is zero-mean.

9. The method of claim 2, where the travel times are observed at irregular intervals of arbitrary duration, and an autoregressive parameter is a mean-reversion rate, determined as an average ratio of a difference between natural logarithms of two consecutive random deviations and a difference between the times when corresponding travel times were observed.

10. The method of claim 5, where the dependency between aggregate estimate of the travel flows and travel times is linear.

* * * * *